Sept. 3, 1940.   R. E. RANEY   2,213,505
CONTROL APPARATUS
Filed Feb. 18, 1939

INVENTOR
Roy E. Raney
BY
Warren H. F. Schmidt
ATTORNEY

Patented Sept. 3, 1940

2,213,505

UNITED STATES PATENT OFFICE 2,213,505

CONTROL APPARATUS

Roy E. Raney, Columbus, Ohio, assignor to Ranco Incorporated, Columbus, Ohio, a corporation of Ohio Application February 18, 1939, Serial No. 257,210

1 Claim. (Cl. 62—4)

This invention relates to a new and improved control apparatus for heat exchange systems, and more particularly to a new and improved control apparatus for a refrigerating system.

An object of the present invention is to provide a control apparatus for a heat exchange system comprising a heat exchanger for affecting the temperature of a medium and having means for circulating a heat exchange fluid, or medium, through the heat exchanger for affecting the temperature thereof, the control apparatus being responsive to the temperatures of the heat exchanger to control the circulating means and also being responsive to the temperature of the medium for constantly affecting the control of the control apparatus on the circulating means.

Another object of the invention is to provide a control apparatus for a heat exchange system, as set forth in the preceding paragraph, that is responsive to the temperature of the exchanger to control the circulating means for initiating one phase of a temperature cycle of the exchanger and responsive to another temperature of the exchanger for terminating the phase when the medium is at a desired temperature, and for also terminating the cold phase in response to a third temperature of the exchanger when the temperature of the medium is varied from the desired temperature thereof, the differential between the temperatures of the absorber at which the phase is terminated being predetermined according to the degree of temperature variation from the desired temperature of the medium.

Another object of the present invention is to provide a control apparatus for a heat exchange system, including a heat exchanger that is disposed in heat transfer relation with a medium to be affected thereby and through which a heat exchange fluid is adapted to be circulated, for controlling the circulation of the fluid for initiating one phase of temperature cycles of operation of the system solely in response to one temperature of the exchanger and for terminating that phase of operation at another temperature of the exchanger when the temperature of the medium is at a certain desired temperature, and when the temperature of the medium varies from the desired temperature to extend the mentioned phase until the temperature of the exchanger is changed a predetermined degree from the one of the other mentioned temperatures of the exchanger.

A further object of the invention is to provide a control apparatus for a heat exchange system, such as described in the preceding paragraph, that is responsive to the temperatures of the heat exchanger for initiating one phase of a temperature cycle of the exchanger at one temperature and terminating the phase at another temperature and having a device responsive to the temperature of the medium to be affected to affect the control apparatus to progressively increase the temperature differential between the starting and terminating temperatures of the phase as the temperature of the medium is progressively varied from a certain desired temperature.

A still further object of the present invention is to provide a control apparatus as set forth in the preceding paragraph having a predetermined maximum temperature differential between the temperatures at which one phase of the cycle is initiated and terminated, irrespective of the degree of temperature variation of the medium beyond a predetermined change from the desired temperature thereof.

Still another object of the invention is to provide a heat exchange system and control therefor as described above in which the circulation of the heat exchange fluid is controlled so that as the temperature of the medium progressively increases or decreases from the desired temperature thereof, the temperatures at which one of the phases are terminated will progressively decrease or increase respectively until a predetermined temperature limit for the termination of the phases is reached.

Further objects and advantages of the invention will be apparent from the following description reference being had to the accompanying drawing wherein a preferred form of embodiment of the invention is clearly shown.

Figure 1:
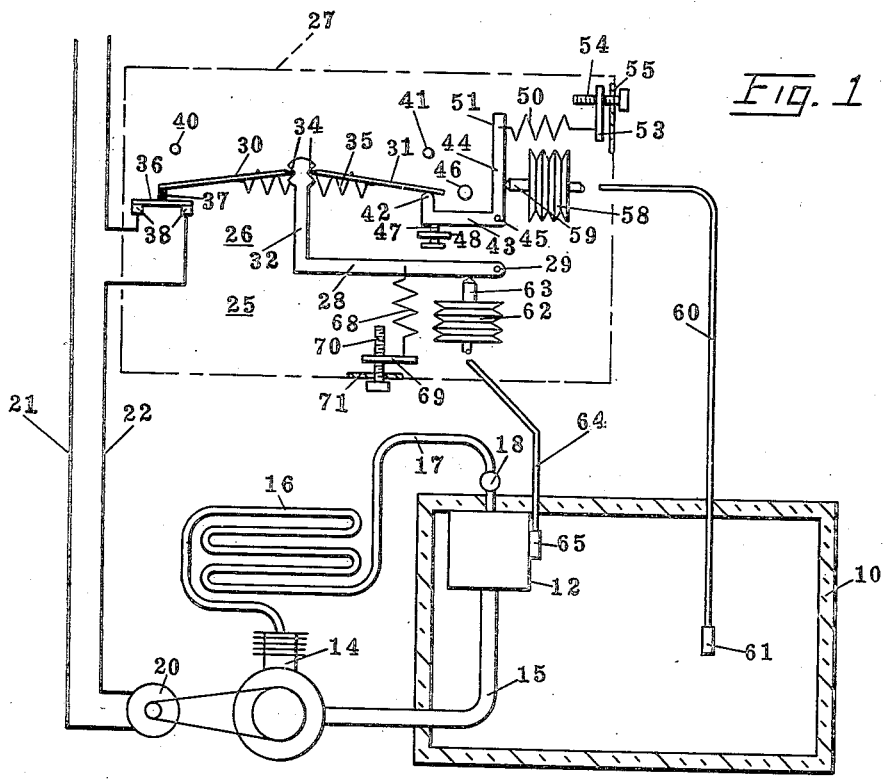
Fig. 1 is a diagrammatic view of a refrigerating system with a control apparatus for controlling the operation thereof.

The present invention relates broadly to a control apparatus for heat exchange systems, such as heating or cooling systems, having a heat exchanger device in heat exchange relation with a medium, the temperature of which is to be affected by the heat exchanger, and having means for circulating a heating or cooling fluid through the exchanger. The circulating means and exchanger might also comprise an electric heater element with a supply therefor.

The invention hereinafter described and illustrated as a control apparatus for controlling the operation of a refrigerating system wherein the heat absorber is the heat exchanger and the compressor is the means for circulating a heat exchange fluid through the exchanger, the fluid being the refrigerant in the system.

Referring to the drawing, an insulated cabinet 10 is shown having a heat absorber 12 mounted therein. The cabinet 10 is preferably for storing meat and like food stuffs that is desired to be maintained at a substantially fixed low temperature. The heat absorber 12 may be of any suitable type or construction and in the present embodiment refrigerant is circulated through the heat absorber 12 by a compressor 14 that withdraws the refrigerant gas from the absorber 12 through the pipe 15, compresses the gas and forces the same into the condenser 16. The condensed refrigerant is directed from the condenser 16 through a pipe 17 to a suitable pressure reducing valve 18 and into the heat absorber 12 where it expands and absorbs heat from the walls of the heat absorber 12, as is well understood by those skilled in the art. Air, or any other suitable medium in the cabinet 10 circulates over the absorber 12 and is cooled thereby. The compressor is adapted to be operated by an electric motor 20 conected in a power circuit including lines 21 and 22.

The motor 20 is controlled by a control apparatus 25, comprising a thermostatically operated switch 26 connected in the line 22 in series with the motor 20. The parts of the control apparatus 25 are mounted on a suitable frame represented at 27. The switch 26 comprises a lever 28 pivoted at 29 on the frame 27, and having two switch members 30 and 31 pivoted on the end of an arm 32 that is formed on the lever 28 at right angles thereto. The switch members 30 and 31 are preferably formed in a U shape and the ends of the legs thereof are pivoted in V notches 34 formed on the end of the arm 32. The end of the arm 32 is furcated and a pair of the notches 34 are formed in two opposite edges thereof. A spring 35 connects the yokes of the switch members 30 and 31 and serves to bias the switch members in either one or the other of two directions about their pivots. A contact bar 36 is connected to the end of the switch member 30 by an insulating member 37 and is adapted to bridge a pair of fixed contacts 38, connected in the line 22, to close the motor circuit when the switch member 30 is moved downwardly. The upward movement of the free end of the switch member 30 is limited by a fixed stop member 40 and the upward movement of the end of switch member 31 is limited by a fixed stop 41. The downward movement of the free end of the switch member 31 is limited by a lug 42 that is carried on the leg 43 of a bell crank lever 44. Thus when the pivoted ends of the switch members 30 and 31 are passed from one side of the center of the spring 35 to the other by the movement of the lever 28, the spring 35 will snap the switch members to the switch opening or closing positions.

The bell crank lever 44 is pivotally mounted on the frame 27 at 45 and the extent of its clockwise rotation about its pivot is limited by a stop member 46 and the extent of its counterclockwise rotation is limited by a screw 47. The screw 47 is threaded in a bracket 48 mounted on the frame 27 so that the extent of counterclockwise rotation of the bell crank lever may be adjusted. Thus the lug 42 may be raised and lowered with respect to the lever 28 by rotating the bell crank lever 44 to the right or left respectively. The bell crank lever is adapted to be biased to the right by a spring 50 that connects the leg 51 of the crank 44 and a plate 53 that is threaded on a screw 54 rotatably supported in a bracket 55. A bellows 58 is connected to the leg 51 of the bell crank lever 44 by a pin 59 and is adapted to rotate the crank lever 44 to the left when expanded. A tube 60 is connected at one end to the bellows 58 and the other end thereof is connected to a bulb 61 disposed inside the cabinet 10. The bellows 58, tube 60 and bulb 61 are filled with a temperature responsive fluid, such as methyl chloride, so that the pressure in the bellows will be affected by the temperatures of the atmosphere in the cabinet. Thus, the position of the lug 42 is controlled according to the temperature of the air in the cabinet 10.

The lever 28 is adapted to be moved upwardly by the expansion of a bellows 62 that is connected thereto by a pin 63. A tube 64 is connected at one end to the bellows 62 and the other end thereof is connected to a bulb 65. The bellows 62, tube 64 and the bulb 65 are filled with a temperature responsive fluid, such as methyl chloride. The bulb 65 is suitably connected in intimate heat transfer relation with the absorber 12 so that variation in temperature of the absorber will affect the pressure of the fluid in a bulb and the bellows. The expansion of the bellows 62 is opposed by a spring 68 that is connected between the lever 28 and a plate 69. Plate 69 is threaded on a screw 70 which latter is rotatively supported by a bracket 71. The tension of the spring 68 may be adjusted by turning the screw 70 thereby moving the plate 69 to increase or decrease the length of the spring 68.

Figure 2:
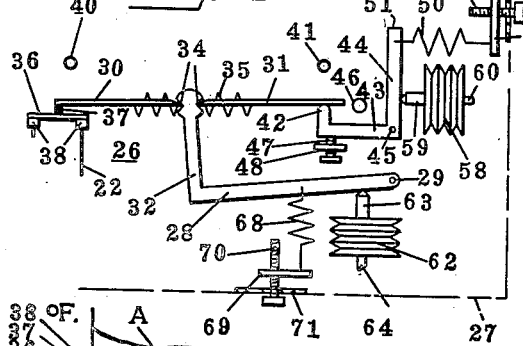
Fig. 2 is a diagrammatic view of parts of the control apparatus shown in Fig. 1, certain of the elements being shown in different positions.
Figure 3:
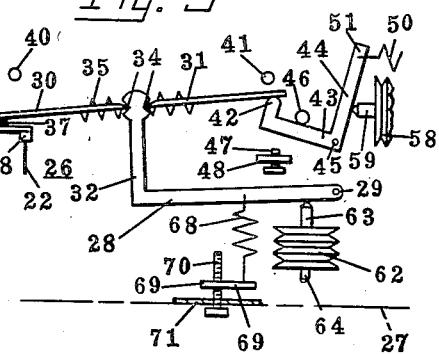
Fig. 3 is a view similar to that of Fig. 2, certain of the elements being shown in a still different position.

When the switch 26 is open, the switch members 30 and 31 are in the raised position against the stops 40 and 41 respectively, and as the temperature of the absorber 12 rises, the pressure of the gas inside the bellows 62 increases causing the bellows 62 to raise the lever 28 upwardly against the tension of the spring 68. This raises the pivoted ends of the switch members 30 and 31 above the center of the spring 35 causing the spring to snap the switch members downwardly to close the switch. The free end of the switch member 31 will stop on the lug 42 when the switch is closed. When the refrigerant is circulated through the absorber 12, by operation of the compressor 14, the absorber becomes cold and fluid in the bellows 62, tube 64 and bulb 65 condenses in the bulb, decreasing the pressure in the bellows 62. This decrease in pressure permits the spring 68 to draw the lever 28 downwardly bringing the pivoted ends of the switch members 30 and 31 below the center of spring 35 to cause the spring to snap the members upwardly and open the switch to stop operation of the compressor. The amount of downward movement of the lever 28 required to open the switch will depend upon the position of the lug 42. This may be noted by comparing the positions of the lever 28 in Figs. 2 and 3 wherein the parts of the apparatus are shown with the switch members 30 and 31 on dead center with the spring 35. In Fig. 2 the lug 42 is in its lowermost position with the bell crank lever 44 against the screw stop 47 and in Fig. 3 the lug 42 is in its uppermost position with the bell crank lever 44 against the stop 46. It is apparent that when the lug 42 is in its lowermost position the lever 28 must travel a greater distance downwardly to effect the opening of the switch than when the lug 42 is raised from its lower position. Thus as the lug 42 is progressively lowered from its upper position shown in Fig. 3 a progressively lower temperature must be produced in the absorber 12 to cause the switch to open. It follows that as the lug 42 is progressively raised toward its uppermost position, the temperatures at which the switch will open will also be progressively raised.

The temperature at which the switch will close is determined by the tension in the spring 68, and in the present system it is preferable to adjust the spring to cause the switch to close when the temperature of the absorber 12 reaches 34 deg. F. so that ice or frost accumulating on the absorber during cold operation thereof will melt from the coils during each cycle of operation of the system. This prevents accumulation of ice on the absorber. The screw 47 should be adjusted so that when the lug 42 is in its lowermost position the switch will not open until the temperature of the absorber reaches 10 deg. F. The stop 46 is preferably positioned so that, when the lug 42 is in its uppermost position against the stop, the switch will open when the temperature of the absorber 12 reaches 30 deg. F. Thus when the lug 42 is in its uppermost position the control apparatus will control the compressor to produce temperature cycles in the absorber 12 between 34 deg. F. and 30 deg. F., i. e., the cold phase of the absorber will be initiated at 34 deg. and terminated at 30 deg., and the warm phase will be initiated at 30 deg. and terminated at 34 deg. The spring 50 is preferably adjusted so that, when the temperature of the air in the cabinet 10 is at or below 36 deg. F., the temperature desired, the bellows 58 will be compressed and the bell crank lever 44 moved to the right with bell crank lever 44 against the stop 46. In this situation the lug 42 is in its uppermost position, and as the temperature in the cabinet raises above 36 deg. F. the bellows 58 is adapted to expand and move the lever 44 to the left, lowering the lug 42. The lug 42 is adapted to be progressively lowered as the temperature of the air in the cabinet progressively rises until the temperature of the air reaches 38 deg. F., at which temperature the lug 42 will be moved to its lowermost position with the bell crank lever against the screw 47 as shown in Figs. 1 and 2. Thus as the temperature of the atmosphere in the cabinet 10 varies between 36 and 38 deg. F. the position of the lug 42 will be varied and the temperatures of the absorber at which the switch will be opened will be progressively lowered from 30 deg. F. to 10 deg. F. as the temperature of the air in the cabinet 10 rises from 36 deg. F. to 38 deg. F.

Thus, assuming that the compressor of the refrigerating system is idle and the temperature of the atmosphere in the cabinet 10 is above 38 deg. F., the temperature of the absorber will rise to 34 deg. F., and the bellows 62 will close the switch 26 and start operation of the compressor 14. The operation of the compressor produces a cold phase of operation of the absorber 12 which cools the air within the cabinet 10. However, if the temperature of the air in the cabinet 10 remains above 38 deg., the lug 42 will remain in the lowered position and the switch will not be opened until the cold phase of operation lowers the temperature of the absorber to 10 deg. F. at which point the cold phase is terminated. The absorber will again warm up to 34 deg. F. and the cold phase operation will be initiated again. The operation of the refrigerating system thus far described is shown in $a$ of the graph shown in Fig. 4, wherein A represents the temperature of the air in the cabinet 10 and B the temperature of the absorber 12. Should the temperature of the atmosphere in the cabinet 10 be reduced, for example, to 37½ deg. F. after one or more cycles of operation, the bellows 58 will contract slightly and the spring 50 will move the bell crank lever 44 clockwise and raise the lug 42 to a position intermediate its lower and upper positions, shown in Figs. 2 and 3 respectively. This causes the control apparatus to terminate the cold phases of operation at a slightly higher temperature of the absorber 12 than formerly, as for example, 15 deg. F. as shown at $b$ of Fig. 4. As the temperature of the air in the cabinet progressively decreases to 36 deg. F. the temperature at which the cold phase of operation of the absorber 12 is terminated is progressively increased, and vice versa. This operation is graphically illustrated at $c$ in Fig. 4. Thus when the temperature of the atmosphere in the cabinet reaches 36 deg. F., the spring 50 will move the bell crank lever 44 against the stop 46 to cause the switch 26 to open when the temperature of the absorber reaches 30 deg. F. This is shown at $d$ in Fig. 4.

Thus as long as the temperature of the air in the cabinet 10 remains at 36 deg. F. or below, the absorber 12 will cycle between the temperatures of 34 deg. and 30 deg. F. but as the temperature of the air in the cabinet 10 progressively rises, due to heat losses through the walls of the cabinet and the addition of warm bodies in the cabinet, the termination of the cold phases of operation of the absorber 12 will be progressively extended below 30 deg. F. until the temperature in the cabinet rises to 38 deg. F. or higher, and at these temperatures the cold phases will be terminated at a minimum low temperature of 10 deg. F. That is, irrespective of the rise in temperature in the air in the cabinet above 38 deg. F., the cold phases will not be terminated below 10 deg. F. This minimum low temperature may be varied by adjusting the screw stop 47 for the crank lever 44. Thus the control apparatus may be adjusted so that the motor circuit will be opened before the lowest temperature capable of being produced in the absorber by the refrigerating system is reached so that when the air temperature is exceptionally high, due to warm bodies in the cabinet, the absorber will not run continuously, and collect a thick coating of ice thereon.

Figure 4:
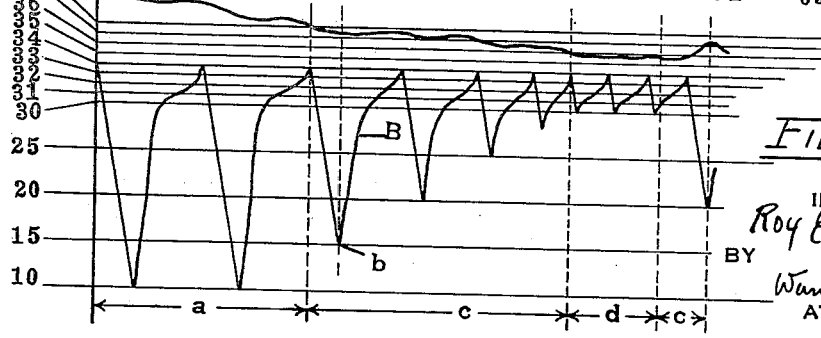
Fig. 4 is a chart representing the temperatures of the heat interchanger and the space affected thereby during a period of operation of the system.

The frequent cycling of the refrigerating system shown at $d$ of Fig. 4 maintains constant circulation of air in the cabinet by convection and tends to maintain a substantially constant desired temperature in the cabinet 10.

It is to be understood that the temperatures set forth in the description of the operation of the apparatus are merely illustrative, other temperature limits may be used for producing desired results.

While the form of embodiment of the present invention as herein disclosed constitutes a preferred form, it is to be understood that other forms might be adopted, all coming within the scope of the claim which follows:

I claim:

In a refrigerating system including a heat absorber for cooling a refrigerating medium and means for circulating refrigerant through the absorber for producing temperature cycles of the absorber comprising warming and cooling phases; means for initiating the cold phase of operation solely in response to a temperature of the heat absorber above the melting point of water and for terminating the cold phase at a predetermined temperature of the heat absorber lower than the first mentioned temperature; and means for terminating the cold phase at a temperature intermediate the two mentioned temperatures in response to a certain temperature of the medium.

ROY E. RANEY.